United States Patent [19]

Hecht

[11] Patent Number: 5,189,548
[45] Date of Patent: Feb. 23, 1993

[54] ELECTROOPTIC TIR LIGHT MODULATOR IMAGE BAR HAVING MULTIPLE ELECTRODES PER PIXEL

[75] Inventor: David L. Hecht, Palo Alto, Calif.

[73] Assignee: Xerox Corporation, Rochester, N.Y.

[21] Appl. No.: 816,452

[22] Filed: Dec. 31, 1991

[51] Int. Cl.$^5$ .......................... G02F 1/03; G02F 1/29
[52] U.S. Cl. .................................... 359/263; 359/318
[58] Field of Search ............... 359/254, 263, 315, 318

[56] References Cited

U.S. PATENT DOCUMENTS

| | | | |
|---|---|---|---|
| 4,281,904 | 8/1981 | Sprague et al. ............ | 350/356 |
| 4,369,457 | 1/1983 | Sprague ..................... | 346/160 |
| 4,396,252 | 8/1983 | Turner ........................ | 350/355 |
| 4,450,459 | 5/1984 | Turner et al. ............... | 346/160 |
| 4,514,739 | 4/1985 | Johnson et al. ............. | 346/108 |
| 4,557,563 | 12/1985 | Sprague ..................... | 359/315 |
| 4,673,953 | 6/1987 | Hecht ......................... | 346/108 |
| 4,940,314 | 7/1990 | Hecht ......................... | 350/355 |

OTHER PUBLICATIONS

William D. Turner et al, "Advances in Laser Scanning Technology", Proceedings of SPIE, Aug. 27–28, 1981, vol. 299.
Robert A. Sprague et al, "Linear total internal reflection spatial light modulator . . . ", SPIE, 1982, vol. 299.
Robert A. Sprague et al, "Advances in Laser Scanning . . . ", Proceedings of SPIE, Aug. 19–20, 1983, vol. 396, pp. 44–49.
Richard V. Johnson et al, "Characteristics Of The Linear Array Total Reflection . . . ", Optical Engineering, Nov./Dec. 1983, vol. 22, No. 6, pp. 665–674.

*Primary Examiner*—Bruce Y. Arnold
*Assistant Examiner*—Evelyn A. Lester
*Attorney, Agent, or Firm*—Townsend and Townsend

[57] ABSTRACT

Increasing the addressing capability of an optical image bar having a particular pixel center-to-center spacing (pixel pitch) is accomplished by employing a plurality of N electrodes per pixel. Compared to an optical image bar with one electrode per pixel, this provides N times as many locations for the electric potential transition which establishes the center of the pixel. The provision of multiple electrodes per pixel interval can be used to implement interlacing.

4 Claims, 10 Drawing Sheets

IDEAL STEP INPUT

IDEAL FINITE DIFFERENCE RESPONSE

NONIDEAL STEP INPUT

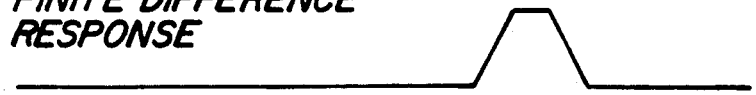
FIG. 8D. FINITE DIFFERENCE RESPONSE
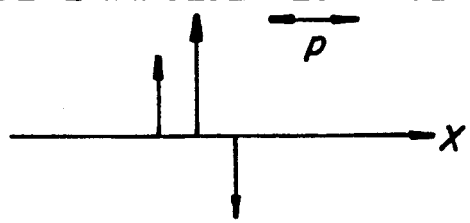
FIG. 8E. DIFFERENTIAL ENCODING IDEAL IMPULSE RESPONSE
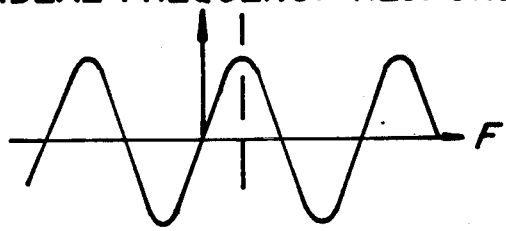
FIG. 8F. DIFFERENTIAL ENCODING IDEAL FREQUENCY RESPONSE
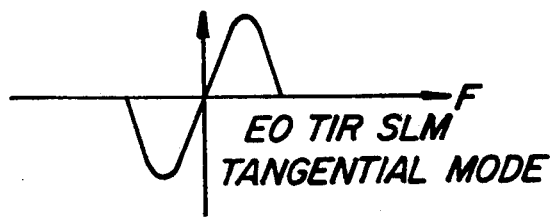
FIG. 8G. SATISFACTORY FREQUENCY RESPONSE — EO TIR SLM TANGENTIAL MODE
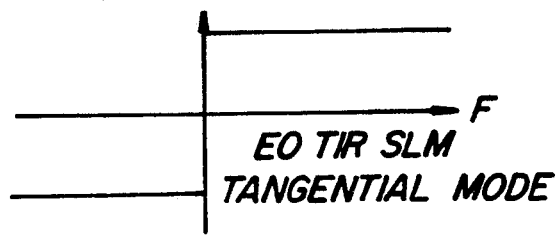
FIG. 8H. LONG ELECTRODE HIGH ANGLE FREQUENCY RESPONSE — EO TIR SLM TANGENTIAL MODE

DIFFCODEGO=2FILTER1283.DRAW

ELECTROOPTIC TIR LIGHT MODULATOR IMAGE BAR HAVING MULTIPLE ELECTRODES PER PIXEL

BACKGROUND OF THE INVENTION

The present invention relates generally to optical image bar printing, and more particularly to an electrode array configuration for an image bar.

As a matter of definition, an "optical image bar" comprises an array of optical pixel generators for converting a spatial pattern, which usually is represented by the information content of electrical input signals, into a corresponding optical intensity profile. Although there are a variety of applications for such devices and a number of different fields, a significant portion of the effort and expense that have been devoted to their development has been directed toward their application to electrophotographic printing.

One type of image bar is based on the use of electrooptic (EO) total internal reflection (TIR) spatial light modulators, as described in U.S. Pat. No. 4,396,252 to W. D. Turner, hereby incorporated by reference. The modulator comprises a set of laterally separated, individually addressable electrodes, which are maintained closely adjacent a reflective surface of an optically transparent EO element, such as a lithium niobate crystal. In operation, substantially the full width of the EO element is illuminated by a transversely collimated light beam. This light beam is applied to the EO element at a near grazing angle of incidence with respect to its reflective surface, and is brought to a wedge-shaped focus on that surface so that it is totally internally reflected therefrom.

Voltages representing a linear pixel pattern are applied to the individually addressable electrodes, whereby localized fringe electric fields are coupled into the EO element. These fields produce localized variations in the refractive index of the EO element, so the wavefront of the light beam is spatially phase modulated in accordance with the pixel pattern as it passes through the EO element. The process is repeated for a sequence of pixel patterns, with the result that the wavefront of the light beam is spatially modulated as a function of time in accordance with successive ones of those patterns.

For image bar applications of such a modulator, schlieren optics are employed to convert the phase modulated wavefront of the light beam into a corresponding series of optical intensity profiles. If a printing function is being performed, these intensity profiles are in turn used to expose a photosensitive recording medium, such as a xerographic photo receptor, in accordance with the image defined by the successive pixel patterns.

U.S. Pat. No. 4,940,314, issued Jul. 10, 1990, to D. L. Hecht, hereby incorporated by reference, addresses the problem that the effective diameter of the pixels produced by an EO image bar, as measured between their half power points at unity magnification, is approximately one-half the center-to-center spacing of its electrodes. Accordingly, such image bars not only tend to cause image distortion because of spatial quantitization errors, but also characteristically produce inter-pixel intensity nulls.

The '314 patent describes a technique wherein a discrete optical image bar sequentially generates a plurality of independent pixel patterns at different center wavelengths, and a prism system disperses those pixel patterns in accordance with their respective wavelengths to passively increase the spatial addressing capacity of the image bar. The wavelengths of the pixel patterns, the angular dispersion of the prism system, and the length of the optical arm along which the dispersion has effect are selected so that the pixel patterns are laterally offset from one another on the output image plane by a distance that is less than the center-to-center spacing of the pixels of any one of those patterns. As a general rule, the wavelength of the pixel patterns is cyclically or otherwise recurrently varied, so that the pixel patterns are interlaced in accordance with a predetermined lattice-like interlacing pattern.

The '314 patent refers to a copending application disclosing an alternative technique for increasing the spatial addressing capacity of the discrete image bar by using mechanical motion of some type to translate the position of the optical footprint laterally relative to its output image as a function of time. Thus, the image bar can incoherently superimpose on the image plane a plurality of independent pixel patterns which are laterally offset from one another by a distance that is less than the center-to-center spacing of the pixels of any one of those patterns.

SUMMARY OF THE INVENTION

The present invention provides a technique for increasing the spatial addressing capability of a discrete image bar without resorting to mechanical motion or multiple-wavelength light sources.

In brief, the invention contemplates increasing the addressing capability of an optical image bar having a particular pixel center-to-center spacing (pixel pitch) by employing a plurality of N electrodes per pixel. Compared to an optical image bar with one electrode per pixel, this provides N times as many locations for the electric potential transition which establishes the center of the pixel.

The provision of multiple electrodes per pixel interval can be used to implement interlacing. This can be accomplished by uniformly spacing all pixel positions on one line by the pixel spacing, and then shifting all pixel positions on the succeeding lines by translating all pixel positions by one electrode interval.

The output image depends upon the input data voltage pattern on the electrodes and the spatial frequency response of the image bar. To the extent possible, it is desired that there be an ON pixel for each voltage step between adjacent electrodes, and that individual pixels be of substantially the same shape and size regardless of the data pattern. The invention is based in part on a recognition that the pixel size and quality resulting from a voltage difference between electrodes are determined primarily by the overall image bar spatial frequency response, which is not changed substantially by subdividing the electrodes. Accordingly, a set of preferred physical parameters can be determined by selecting parameter values to provide the desired spatial frequency response. This is made possible by an improved understanding of the way that the physical parameters affect the frequency response.

It has been found that the parameter values that optimize the spatial frequency response do not necessarily optimize diffraction efficiency, and that other considerations might dictate non-optimum values. For example, it may be desired to use illumination conditions and electrode lengths that optimize efficiency, but do not optimize spatial frequency response. Under such conditions, it is sometimes possible to obtain the desired frequency response by using a compensation filter and thus simultaneously optimize efficiency and spatial frequency response. The filter may be chosen to define the spatial frequency response over the entire range of relevant frequencies, depending on the other parameters.

A further understanding of the nature and advantages of the present invention may be realized by reference to the remaining portions of the specification and the drawings.

BRIEF DESCRIPTION OF THE DRAWINGS

FIGS. 8A-H show the amplitude and frequency response for differential encoding.

DESCRIPTION OF SPECIFIC EMBODIMENTS

System Overview

Figure 1:
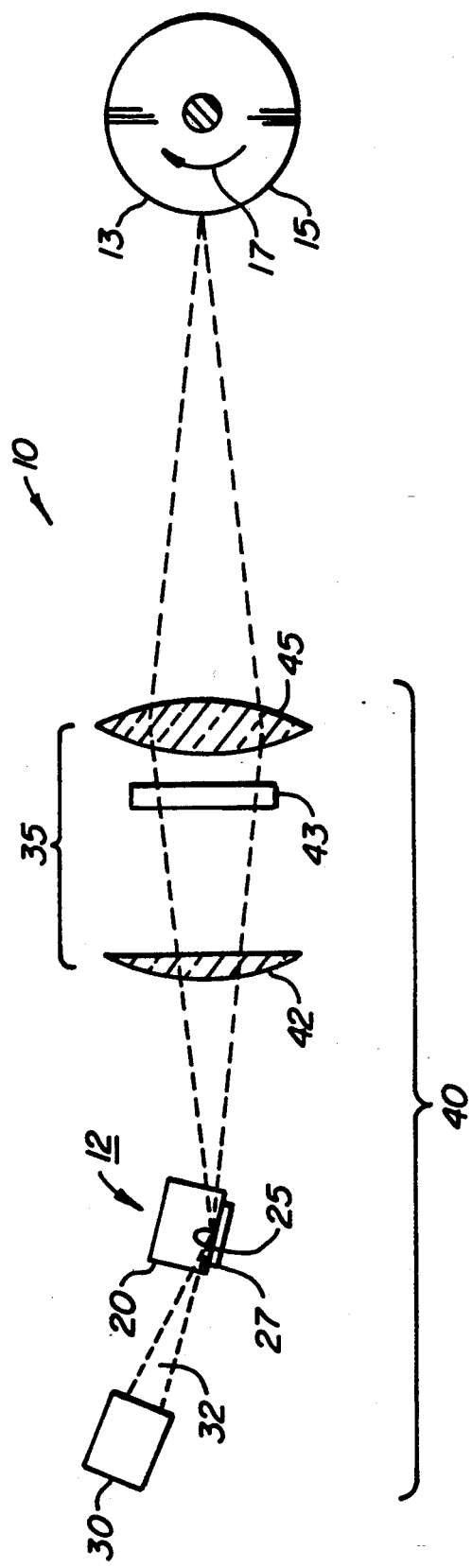
FIG. 1 is a schematic side view of the optical train of an optical image bar printer incorporating the present invention.
Figure 2:
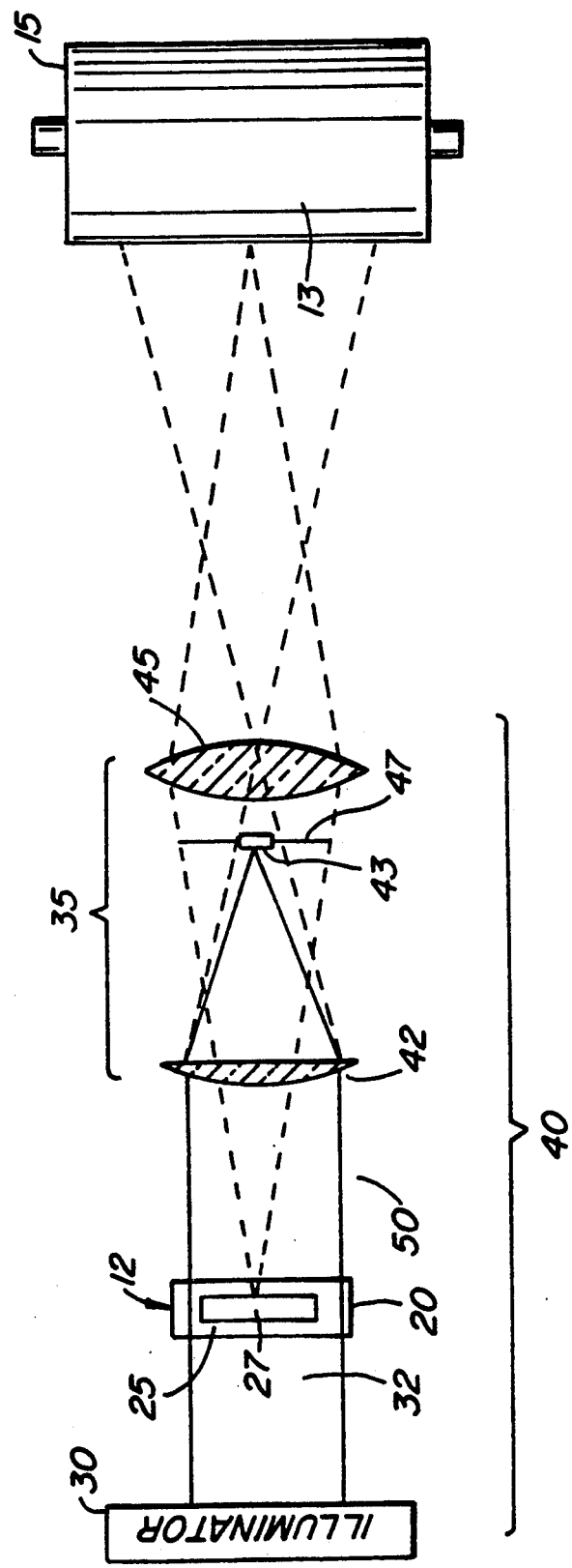
FIG. 2 is a schematic top view of the optical train of the printer.

FIGS. 1 and 2 are schematic side and top views illustrating the optical train of a line printer 10 having an EO spatial light modulator 12 for printing an image on a photosensitive recording medium 13. As shown, the recording medium is a photoconductively coated drum 15 which is rotated by any convenient drive mechanism in the direction of the arrow 17. Nevertheless, other xerographic and non-xerographic recording media, including photoconductively coated belts and plates, as well as photosensitive films and coated papers could be used. Thus, in the generalized case, recording medium 13 should be visualized as being a photosensitive medium which is exposed while advancing in a cross-line or line pitch direction relative to modulator 12.

Figure 3:
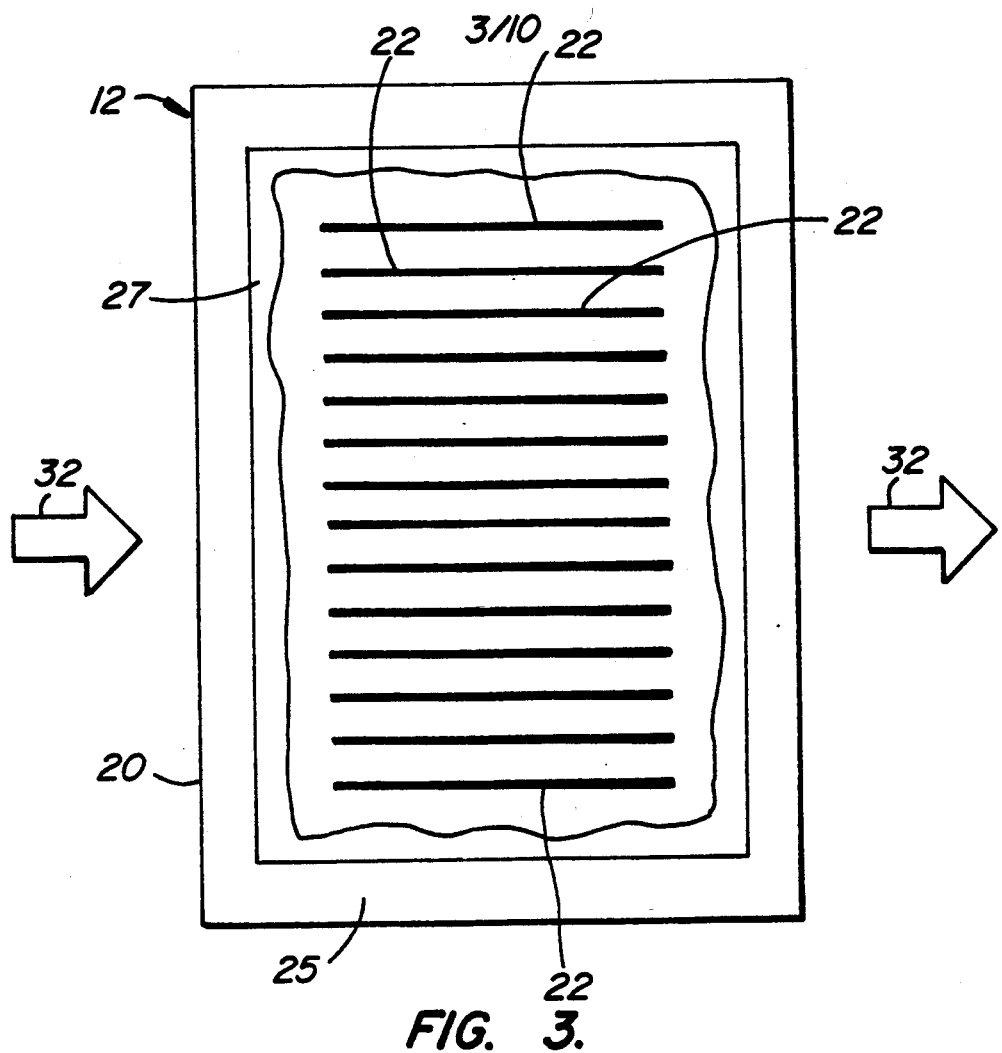
FIG. 3 is a partly cut away bottom view of the EO modulator.

FIG. 3 is a partially cut-away bottom view of EO spatial light modulator 12. In keeping with standard practices, the modulator comprises an optically transparent EO element 20, such as an optically polished, y-cut crystal of lithium niobate, and a plurality of individually addressable electrodes 22. Electrodes 22 are deposited on, or held closely adjacent, a longitudinal reflective surface 25 of EO element 20. For example, they may be integrated with their addressing and drive electronics on a VLSI silicon circuit 27, and the modulator may then be assembled so that the electrodes are pressed against the reflective surface (by any convenient mechanism not shown). Typically, electrodes 22 extend lengthwise along EO element 20 and are transversely spaced on more or less uniformly displaced centers.

In operation, an illuminator 30 supplies a transversely collimated light beam 32 which is expanded by any convenient optical elements not shown) if and as required to illuminate substantially the full width of EO element 20. This light beam is brought to a wedge-shaped focus at a near grazing angle of incidence on the reflective surface of the EO element and is totally internally reflected therefrom. Successive sets of data samples are sequentially applied to electrodes 22, whereby the phase front of light beam 32 is spatially modulated while passing through EO element 20 in accordance with successive pixel patterns as a function of time.

The beam direction relative to the EO modulator is characterized by a grazing angle $\gamma$ and a skew angle $\theta$. The grazing angle is the angle between the center of the beam and the plane of the reflecting surface, measured outside the modulator. The skew angle is the projected angle of the beam relative to the direction of the electrodes. The drawings show axial operation (skew angle of zero).

A central dark field schlieren imaging system 35 (FIGS. 1 and 2) converts the phase modulated wavefront of light beam 32 into a corresponding intensity profile. The combination of modulator 12 with illuminator 30 and schlieren imaging system 35 is an example of what is referred to herein as a discrete image bar 40.

A central dark field system suitably includes an objective lens 42 for focusing the transversely collimated zero order diffraction components of light beam 32 (collectively represented by solid line rays in FIG. 2) onto an opaque stop 43. The distance between EO element 20 and lens 42 is exaggerated. In a specific embodiment, the two are close so that lens 42 acts as a field lens. The zero-order components of light beam 25 are blocked because the stop is centrally located in the rear focal plane of the field lens, but the higher order diffraction components (collectively represented by broken line rays in FIG. 2, together with broken line cones for a single pixel) scatter around stop 43 and are collected by an imaging lens 45. Lens 45, in turn, focuses them on recording medium 13 with a predetermined magnification.

As will be described below, the imaging system may include a compensating spatial filter 47 located in a far field plane, which may be the same plane as that of stop 43. Such a spatial filter would be used as one way to optimize the spatial frequency response of the image bar in order to produce uniform pixels of the desired size.

Figure 4:
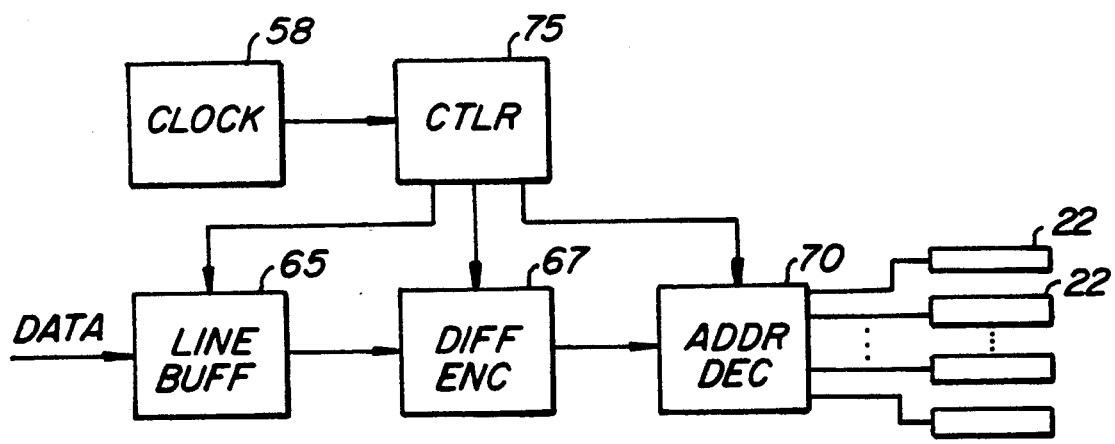
FIG. 4 is a simplified block diagram of the electronic control system of the printer.

FIG. 4 is a block diagram illustrating circuitry for communicating data to electrodes 22 and controlling illuminator 30. Basic timing for the circuitry and the operations described below is established by a clock generator 58. An incoming data stream is input to a data buffer 65, encoded at a differential encoder 67, and communicated to address decoding circuitry 70. A controller 75 manages the data flow through the buffer and encoder, and provides sequential addresses to decoding circuitry 70 so as to cause a line of data to be applied to electrodes 22 during a data loading interval. Voltages corresponding to the data values are held on the electrodes during a subsequent data hold interval, and the illuminator is turned on and then off during the data hold interval to effect recording of the line of data. The process is then repeated for subsequent lines.

Multiple Electrodes Per Pixel

Figure 5A:
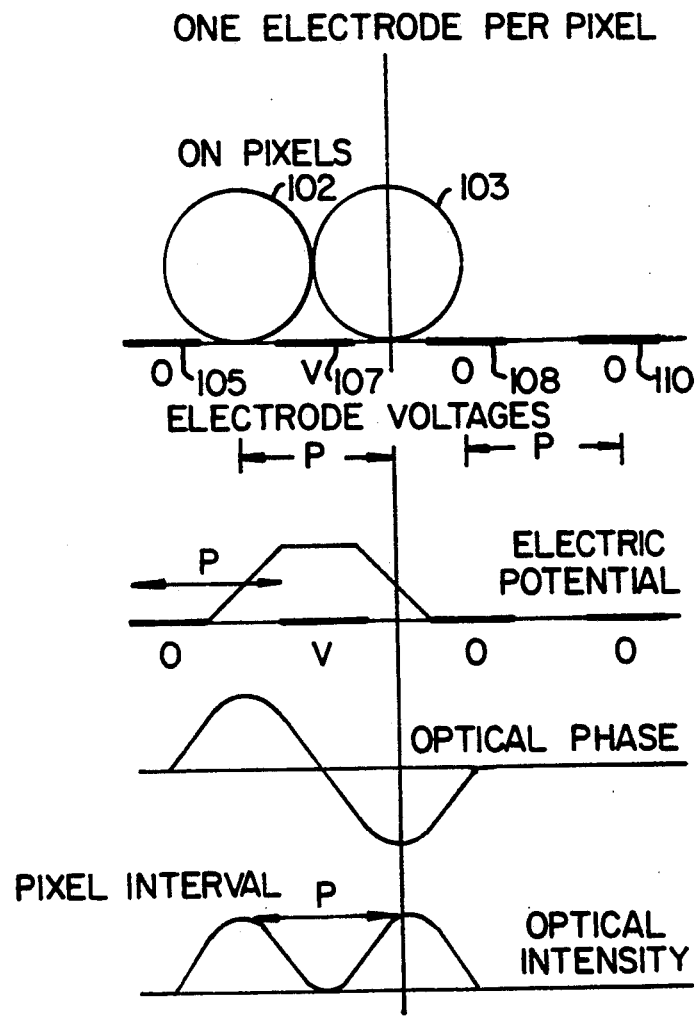
FIG. 5A shows schematically the prior art electrode and pixel configuration, and plots of electrical potential, phase shift, and recorded pixel intensity.
Figure 5B:
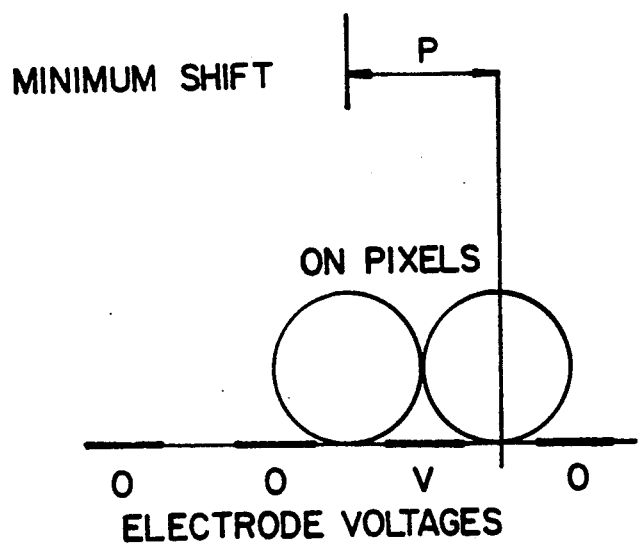
FIG. 5B shows the minimum shift possible for the configuration of FIG. 5A.

FIGS. 5A and 5B illustrate the relationship of the pixels and electrodes in a typical prior art configuration. The top half of FIG. 5A shows a pair of adjacent pixels 102 and 103 resulting from a pattern of differentially encoded voltages on a set of electrodes 105, 107, 108, and 110. In this configuration, the pixels are characterized by a center-to-center spacing of P (pixel pitch), which also corresponds to the center-to-center spacing of the electrodes. Adjacent ON pixels are shown as touching circles, but it should be understood that the intensity distribution across a pixel is such that a typical pixel has a full width at half intensity of approximately P/2, so that the pixels are characterized by interpixel nulls.

The data is differentially encoded so that an ON pixel is produced at locations between electrodes that are at different voltages. The voltages on the electrodes in FIG. 5A are 0, V, 0, and 0, thus providing for an ON pixel centered between electrodes 105 and 107, and one between electrodes 107 and 108, as defined by the differential encoding of the signal on the electrodes. As described above, ON pixels will be produced resulting from the modulation caused by the differential voltage between electrodes 105 and 107 and between electrodes 103 and 108. Since there is no voltage differential between electrodes 108 and 110, no ON pixel is formed. FIG. 5A also shows the approximate electrical potential at the surface of EO element 20, the amplitude of the electro-optical phase shift produced by the resultant electric field, and the optical intensity resulting at the image plane of schlieren imaging system 35.

The minimum transverse shift of pixel locations is defined by the electrode spacing. As shown in FIG. 5B, when the voltage pattern is shifted to the right by one electrode interval, a corresponding shift in the pixel pattern occurs. Accordingly, when the desirability of shifting pixel patterns by less than a full pixel width was recognized, the prior art utilized mechanical or dispersive means to effect the desired displacement.

Figure 6A:
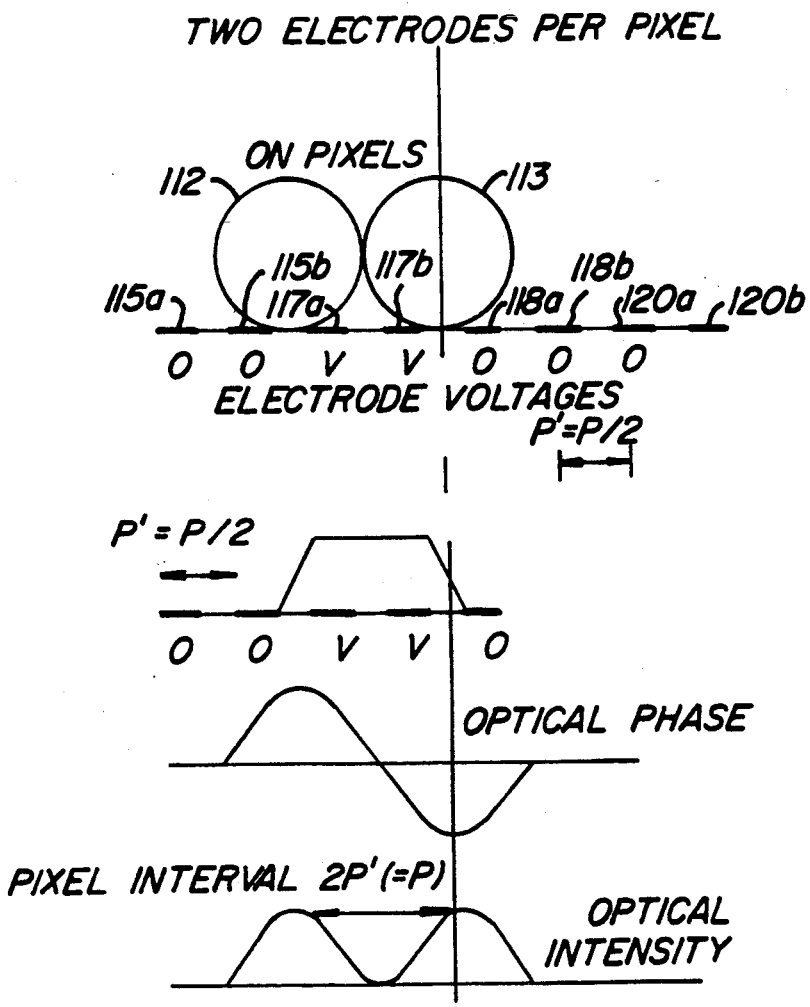
FIG. 6A shows schematically the electrode and pixel configuration, and plots of electrical potential, phase shift, and recorded pixel intensity for the present invention.
Figure 6B:
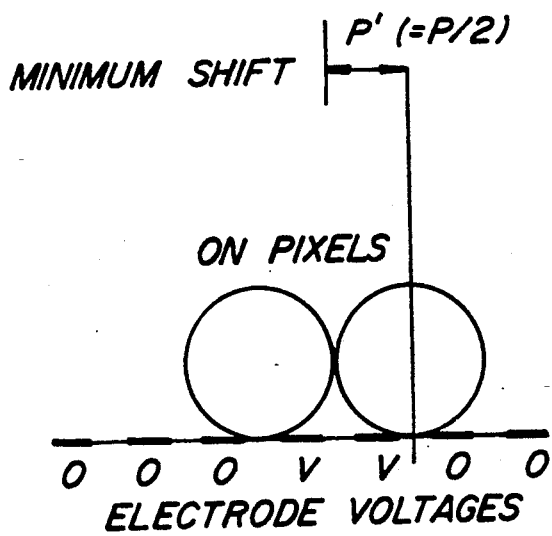
FIG. 6B shows the minimum shift possible for the configuration of FIG. 6A.

FIGS. 6A and 6B show the electrode and pixel configuration, and the minimum shift possible when a multiple-electrode-per-pixel configuration according to the present invention is used. FIG. 6A shows a pair of ON pixels 112 and 113 resulting from a set of voltages on a set of electrode pairs 115a-b, 117a-b, 118a-b, and 120a-b. In this case, the electrodes have a center-to-center spacing of P'=P/2, but the voltage does not change any more frequently than once every two electrodes. Thus, the minimum ON pixel center-to-center spacing is 2P' (=P). FIG. 6A also shows the electrical potential, electro-optical phase shift amplitude, and optical intensity for this configuration.

FIG. 6B shows the resultant pixel pattern when the voltages are shifted one electrode to the right. In this case, the pixels maintain the same minimum pixel pitch P and size, but are shifted by a distance of P' (=P/2).

At first glance, it would appear that it would be possible to pack the pixels more closely together by allowing the separation of transitions to be as close as the electrode pitch P'. However, the result could be excessive interference between adjacent ON pixels.

While the specific example of two electrodes per pixel interval is illustrated, the technique is readily extended to any plurality of N electrodes per pixel (i.e. electrode pitch P' equals 1/N times the minimum pixel pitch P). In such case, the above mentioned constraint is that the encoding must result in groups of at least N electrodes at the same potential. However, there is no requirement that the groups of electrodes at the same potential be integral multiples of N. Thus, the enhanced addressability allows ON pixels at separations of other than integral multiples of NP', still subject to the constraint that the separation of transitions be at least NP'.

Figure 7A:
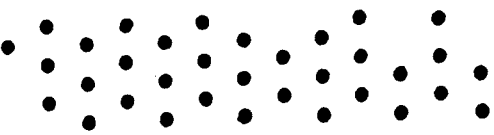
FIGS. 7A-C show various interlace patterns.

The present invention may be used to implement interlacing. This is done by uniformly spacing all pixel positions on one line by the pixel spacing P, and then shifting all pixel positions on succeeding lines by translating all pixel positions by an electrode interval (P/N). The specific case illustrated above, namely N=2, is of practical importance since it enables two-line interlace. The significance of this is that the typical pixel size is approximately P/2 in diameter so that the interlace allows filling of interpixel nulls. It is noted that this method does not inherently provide cross-scan image translation to compensate for recording medium motion between successive scan lines. Unless the medium is stopped for each scan line group, the result is a diamond interlace raster as shown in FIG. 7A. Directly recording rectangular raster data on the diamond lattice will result in systematic cross-scan displacement for alternate pixels along the interlaced lines. This may or may not be a serious effect, depending on image content, recording process, and visual effects. For example, modification to digitized font designs can be used to compensate for this. The diamond interlace raster can be advantageous if the recorded information is appropriately spatially sampled or interpolated, as for example in an electronic reprographics system where the read-in sample locations are inherently independent of image edge location.

Figure 7B:
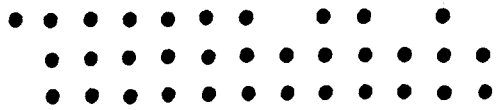

FIG. 7B shows the result of interlace with cross-scan compensation.

Figure 7C:
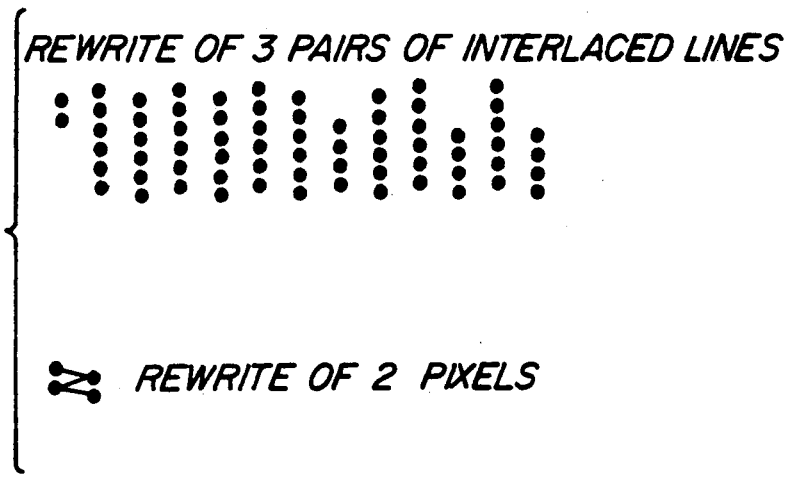

FIG. 7C shows how the displacement effect can be made negligible by switching the modulator back and forth rapidly between the interlaced data sets. This could be implemented by rewriting the data lines, which requires increased modulator data input bandwidth, or by employing a VLSI driver chip with internal storage of the two interlaced lines' data.

Preferred Physical Configuration

The output image depends upon the input data voltage pattern on the electrodes and the spatial frequency response of the overall optical system. This is determined by the intrinsic frequency response of the modulator itself, and the frequency response of other portions of the optical system, such as the spatial filter (if present). To the extent possible, it is desired that there be an ON pixel for each voltage step between adjacent electrodes, and that individual pixels be of substantially the same shape and size regardless of the data pattern.

The intrinsic spatial frequency response of the modulator depends on the physical properties of the modulator, including the electrical and optical properties of the material and the electrode geometry (length and pitch). The overall frequency response also depends on the illumination conditions and the spatial filter. As will be discussed below it is possible to select a physical configuration that suppresses crosstalk and provides high efficiency and uniform pixel size and shape.

It is convenient to define normalized grazing and skew angles $G_0$ and $S_0$, in units of the inter-order angle (the separation of the 0th and 1st diffraction orders), and to define normalized spatial frequency F, drive voltage $V_T$, and electrode length $Q_0$ as follows:

$$G_0 = \gamma/(\lambda/(n\Lambda_0))$$

$$S_0 = \theta/(\lambda/(n\Lambda_0))$$

$$F = f\Lambda_0$$

$$Q_0 = 2\pi L\lambda/(n\Lambda_0^2)$$

$$V_T = 2\pi n^4 r \Lambda_0 V(f)/\lambda^2$$

where $\gamma$ = grazing angle (the angle between the beam and the surface of the electro-optic element)

$\theta$ = skew angle (the angle between the beam and the direction of the electrodes)

f = spatial frequency

V(f) = peak-to-peak voltage of the TIR surface potential spectrum component at spatial frequency f L = electrode length $\lambda$ = optical wavelength n = optical index of refraction $\Lambda_0$ = EO spatial modulation period (2N times electrode pitch, or 2 times minimum pixel pitch P)

The diffraction efficiency $\eta$ as a function of spatial frequency for planewave illumination can be approximated by combining the physical optics diffraction theory results for long electrode length, which gives proper results at high spatial frequencies, with a geometrical optics diffraction analysis for finite electrode length, which is valid for the low spatial frequencies where total internal reflection diffraction suppression effects are small. The resulting expression for $\eta$ is as follows:

$$\eta = H_Q^2 \, V_T^2 \, E \, G_0 \cdot Re \, [(G_0^2 - 2FS_0 - F^2)^{\frac{1}{2}}]/D$$

where

E = ratio of normal to tangential dielectric tensor components $D = \{[(1-E)F + 2S_0 E]^2 + 4EG_0^2\}^2$ $H_Q = 1 - \exp[-|F|G_0 Q_0/(2E^{\frac{1}{2}})]$.

The quantity $V_T$ is a function of spatial frequency, being a normalized version of V(f) which is the peak-to-peak voltage of the TIR surface potential component at spatial frequency f. The quantity depends on the data encoded on the electrodes since the data defines the spatial frequencies that are present. For all pixels ON, the voltage alternates from electrode to electrode so the spatial period is twice the pixel pitch, the spatial frequency is the inverse of this, and the normalized frequency F=1. In this case the value of V is approximately equal to the impressed voltage, differing by a geometrical factor near unity that depends on the electrode width relative to the gap between electrodes.

It should be noted that the equation gives the first order diffraction theory, which is valid for diffraction efficiencies up to about 30%. Beyond 30%, non-linear multiple scattering effects may become important and the linear system frequency response analysis may not be sufficient. The amplitude of the frequency response is given by $H(F) = \eta^{\frac{1}{2}} \, sgn(F)/V_T$.

Where differential encoding is used, it is desired that the diffracted light optical amplitude at a point is proportional to the difference in electrical potential between points spaced by the pixel pitch (which for the case of N electrodes per pixel is N times the electrode pitch). This calls for a response similar to the linear operator known as the finite difference operator.

Figure 8A:
Figure 8B:
Figure 8C:

FIGS. 8A-B show an ideal step input and the finite difference response to the step input taken over an interval P, where P is the pixel pitch. FIGS. 8C-D are corresponding views for a non-ideal step input. The finite difference operator $\Delta(P)$ can be expressed as an odd impulse pair, namely $\Delta(P) = \delta(x+P/2) - \delta(x-P/2)$, as shown in FIG. 8E.

The frequency response is given by the Fourier transform of the finite difference operator. FIG. 8F shows the optimum frequency response for operation with differential encoding. The response varies as $\sin(\pi F/2)$, where F=1 (f=1/(2P)) corresponds to the fundamental "all pixels ON" diffraction component. FIG. 8G shows an acceptable response, which tracks the ideal response over the spatial frequency range $-2 \leq F \leq 2$ where F=2 (f=1/P) is the first zero of the desired frequency response. For one electrode per pixel encoding, or for the more general case where all the normalization is in terms of 2N times the electrode pitch (i.e., 2 times the pixel pitch) response at higher frequencies is not required, as these components only contribute to pixel profile edge sharpness.

FIG. 8H shows the frequency response in the limit of long electrodes and large grazing angle. The response is substantially different from the frequency dependence that is desired. It is, however, possible to tailor the physical parameters to provide the desired frequency response.

In the long electrode limit, it can be shown that the efficiency at F=1 is maximized at a relatively small grazing angle. However, for small grazing angles, the quantity $(G_0^2 - 2FS_0 - F^2)$ becomes negative for some higher but finite spatial frequencies, and therefore the response cuts off above a finite spatial frequency. Fortunately, this cutoff can be exploited to bring the spatial frequency response of FIG. 8H more in line with that of FIG. 8G.

Figure 9A:
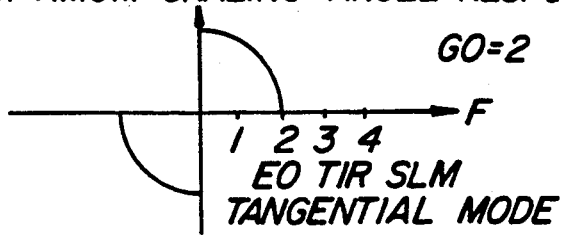
FIGS. 9A-H show the optimization of the image bar spatial frequency response by selection of an appropriate grazing angle, electrode length, and spatial filter.

For axial illumination ($S_0 = 0$), cutoff occurs when $G_0 \geq F$, i.e., when the inter-order diffraction angle for a given spatial frequency equals or exceeds the input grazing angle. Axial illumination is of particular interest since the response is antisymmetric with respect to F as desired for differential encoding. Using $G_0$ substantially less than 2 would truncate part of the desired frequency response for differential encoding below F=2. On the other hand, using $G_0$ substantially greater than 2 would reduce the diffraction efficiency and would make the frequency response depart from the desired form below F=2 with a cutoff at F=2. Therefore, $G_0 = 2$ and $S_0 = 0$ is a preferred illumination condition for the differentially encoded modulator. FIG. 9A shows the spatial frequency response for $G_0 = 2$ and $S = 0$, with a long electrode.

It is important to note that additional conditions are required to achieve the desired frequency response form in the frequency range $-1 \leq F \leq 1$. Two approaches to correcting this frequency response are selecting an optimum electrode length and providing a specially configured optical spatial frequency response filter.

Figure 9B:
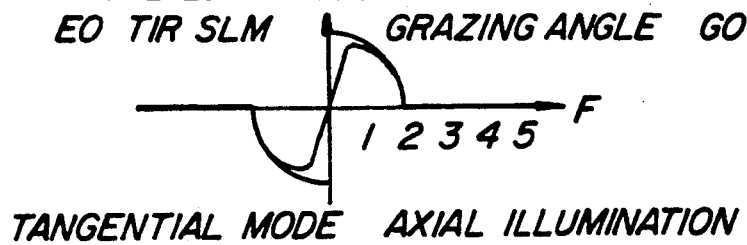
Figure 9C:
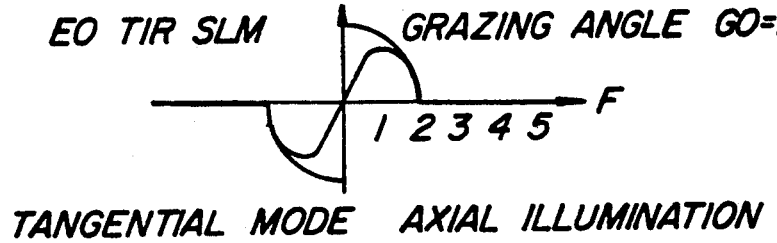

If the electrode length is relatively short, the dependence of the factor $H_Q^2$ in the efficiency equation becomes apparent. In fact, $H_Q$ is approximately linear as a function of F, which means that it also approximates a sinusoidal function of F for small values of F. FIG. 9B shows the frequency response for a finite electrode length; this is clearly closer to the desired response. By selecting the appropriate electrode length, it is possible to fit the frequency response to the desired response in a low frequency region. More particularly, for $F<<1$, $H_Q \approx \sin(FG_0Q_0/(2E^{\frac{1}{2}}))$, which will equal $\sin(\pi F/2)$ for $Q_0 = \pi E^{\frac{1}{2}}/G_0$. This provides the optimum frequency response, as shown in FIG. 9C. In terms of the physical variables this gives $L = E^{\frac{1}{2}}\Lambda_9/(2\gamma) = E^{\frac{1}{2}}P/\gamma$.

This optimum length is independent of the optical wavelength, so that in multi-wavelength operation, frequency response can be simultaneously optimized over a broad range of wavelengths. This is because the interaction path truncation is a geometrical optics effect independent of wavelength. For operation in lithium niobate with the tangential direction along the z crystal axis and the normal direction along the y crystal axis, $E=1.54$ if clamped dielectric constants are effective (2.54 if unclamped dielectric constants are effective). For $E=1.54$, and $G_0=2$, then the optimum value is $Q_0=1.95$. In this case, $H_Q=0.792$ at $F=1$ so that the efficiency for the "all pixels ON" condition for a given voltage is decreased by a factor $H_Q^2=0.63$ compared to a very long electrode. Alternately, the compensating voltage increase is $1/H_Q=1.26$. (For $E=2.54$ and $G_0=2$, then $Q_0=2.50$ and the other quantities scale accordingly). In general, the clamped dielectric constants apply to electrodes switched at high frequency above acoustic resonance; unclamped constants apply below acoustic resonance.

Thus, the dependence of the diffraction efficiency on electrode length allows the selection of an electrode length that provides the desired spatial frequency response. However, the electrode length that optimizes pixel crosstalk suppression is not necessarily the electrode length that is desirable from other points of view. As noted above, the optimum electrode length results in a decrease in efficiency and an increase in the drive voltage required. Moreover, short electrodes may be difficult to align properly, thereby militating toward longer electrodes.

The discussion above is generally in terms of normalized variables, and the statements regarding optimum length assume a fixed minimum pixel pitch P. However, it is possible to have physically long electrodes that optimize both efficiency and frequency response if it is permissible to increase the pitch P (i.e. have the electrodes more widely spaced) while maintaining the normalized parameters the same.

Figure 9D:
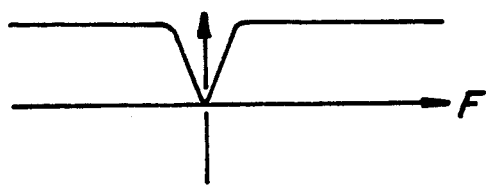
Figure 9E:
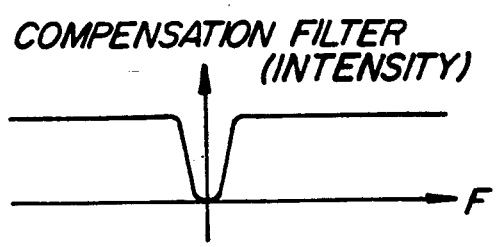

To the extent that it is desired to use longer electrodes than are necessary to optimize the low spatial frequency response of the modulator, it is possible to use a spatial filter (a compensation filter) that provides the desired system response with long electrodes. Assuming the illumination conditions are chosen to result in a cutoff in the modulator's response (as shown in FIG. 9A), the spatial filter should have a transmission characteristic that approximates $|\sin(\pi F/2)|$ in amplitude and $\sin^2(\pi F/2)$ in intensity for absolute values of F less than about 1. This can be expressed in terms of the actual physical spatial dimension in the spatial frequency plane, x, by the scaling relationship $x = Z_f F\lambda/(2P)$ where $Z_f$ is the focal length of objective lens 42. FIGS. 9D and 9E show the amplitude and intensity profiles for a compensation filter that could be used to provide the desired frequency response. This corresponds to a pure absorption filter, and is readily realizable and applicable by such means as a variable density photographic emulsion.

Independent of these considerations, a stop is required to adequately attenuate the zero-order beam for sufficiently high contrast schlieren imaging. If the zero-order light is sufficiently collimated, the compensation filter can perform the function of this stop since in the region $-0.1 \leq F \leq 0.1$, the sine filter transmission is small (less than 1%). However, if the zero- order beam is not narrowly localized over the entire image field due to optical system aberration, an additional high absorption stop may be employed. It need not be tapered because of the simultaneous presence of the compensation filter.

Figure 9F:
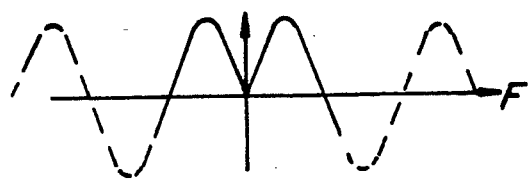
Figure 9G:
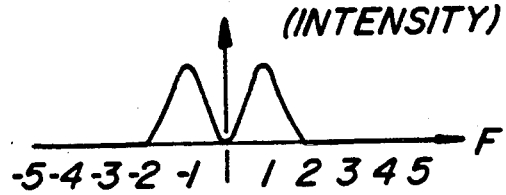
Figure 9H:
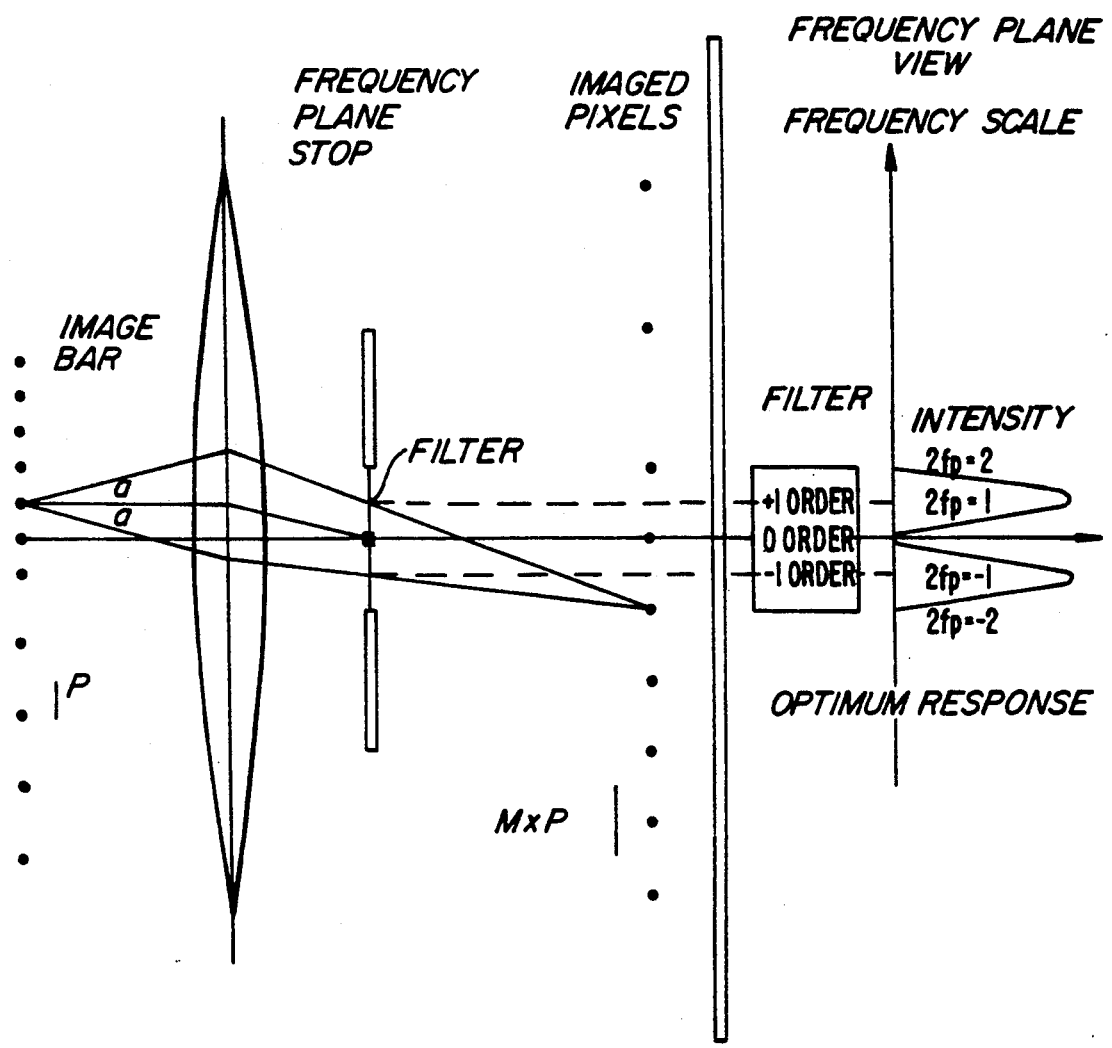

If for some reason it is necessary to use non-optimum grazing angle and electrode length, it is still possible to obtain the desired frequency response solely by use of a compensation spatial filter. For example, in the long-electrode, high-angle case, the filter should have a transmission characteristic that is proportional to $|\sin(\pi F/2)|$ in amplitude and $\sin^2(\pi F/2)$ in intensity for $|F|<2$. FIGS. 9F and 9G show the filter characteristics. This filter requires no absorption at the fundamental frequency ($F=1$) of the modulator (all pixels on response); the absorption reduces excess light and ringing in modulated pattern pixels only. FIG. 9H is a simplified schematic view, which also shows blocking the light above $|F|=2$. It also shows the response relative to the physical device.

Conclusion

In summary, it can be seen that the present invention provides a technique for increasing the spatial addressing capability of EO spatial light modulators. This is accomplished by modifying the design to one containing N electrodes per pixel. However, the conditions that tend to optimize the operation in the case of one electrode per pixel configuration apply equally well in the case of multiple electrodes.

While the above is a complete description of a number of embodiments, various modifications, alternatives, and equivalents may be used. For example, a central bright field system (not shown) could be used to perform the conversion process, although it will be understood that such a change would reverse the logical relationship of the individual pixels within the intensity profile to the localized phase modulation of the wavefront of light beam 32 (i.e., "bright" pixels would become "dark" pixels, and vice-versa, unless steps were taken to account for the reversal in the logical relationship). In such a case, however, the specific techniques for optimizing the spatial frequency response of the image bar might be different.

Therefore, the above description should not be taken as limiting the scope of the invention which is defined by the appended claims.

What is claimed is:

1. In a system that includes an electrooptic total internal reflection light modulator having a set of electrodes, an electronic control subsystem for differentially encoding pixel data on the electrodes by applying corresponding voltages thereto in a manner that defines a minimum pixel pitch P, an illumination subsystem for providing an input beam to the modulator, which input beam is converted to a phase front modulated beam by the modulator and the voltages applied thereto, and an imaging subsystem for converting the phase front modulated beam to an imaged beam having an intensity modulated profile corresponding to the pixel data, the improvement wherein:
- the set of electrodes includes a plurality of N individually addressable electrodes for each pixel, with all electrodes in the set being at a center-to-center spacing of P/N; and
- the optical train and the modulator are configured such that the drive voltage provided by the electronic control subsystem and the resultant pixel size are substantially the same as if the set of electrodes consisted of a single electrode per pixel with an electrode center-to-center spacing of P.

2. The improvement of claim 1 wherein the diffraction efficiency of the system is in part defined by a set of properties of the modulator and the illumination and imaging subsystems and is characterized by a spatial frequency response that approximates $\sin(\pi Pf)$ for absolute values of f less than about 1/P, where f is the spatial frequency.

3. The improvement of claim 2 wherein the electrodes are characterized by a length chosen to cause the frequency response to approximate $\sin(\pi Pf)$ for small absolute values of f.

4. The improvement of claim 1 wherein the input beam impinges on the modulator in a direction parallel to the electrodes and at a grazing angle chosen to cause the frequency response to cut off at absolute values of f above about 1/P, whereupon the spatial frequency response approximates $\sin(\pi Pf)$ for absolute values of f less than about 1/P, where f is the spatial frequency.

* * * * *